Patented Dec. 14, 1926.

1,610,399

UNITED STATES PATENT OFFICE.

EDOUARD URBAIN, OF PARIS, FRANCE, ASSIGNOR TO URBAIN CORPORATION, A CORPORATION OF DELAWARE.

METHOD OF MANUFACTURING HIGHLY-ACTIVE CARBON.

No Drawing. Application filed March 29, 1926. Serial No. 98,376.

For a great many years it has been known that carbon of a certain degree of activity could be produced by carbonizing vegetable material in the presence of various fusible and water-soluble bodies, particularly those which have a dehydrating action, such as zinc chloride, phosphoric acid, ferric chloride and the like. In the presence of such substances, the vegetable material will carbonize very readily and at a lower temperature than if these substances have not been used, and apparently it has been believed that the production of carbon at low temperatures was a factor in its activity. Accordingly, those who have used these materials have always stopped the calcination at about the time when carbonization was complete, that is, at a dull red heat or a temperature of about 700° C.

I have discovered that far more active carbon can be produced if vegetable material is calcined in the presence of such bodies at a materially higher temperature which should exceed 800° C. and preferably is carried up to a temperature of about 1000° C. At this higher temperature range, the bodies referred to act in a different way from what they did at a lower temperature, and a new and highly important result is produced. In order to understand this result a certain theoretical discussion should be given.

If one studies absorption by carbons, of gases under conditions of temperature, pressure and concentration which are far removed from the point of liquefaction of such gases, there is no appreciable difference between the absorptive capacity of carbons resulting from simple carbonizing of organic matter and the carbons which have been subjected to a special treatment by which they have been made active; in other words, ordinary charcoal and specially prepared active carbon will, for example, absorb about the same amounts of anhydrous sulphurous acid at the ordinary temperature when the concentration and therefore the partial pressure are low. However, these two classes of carbons will show very different degrees of absorption when used in connection with vapors of substances which are liquid or solid at atmospheric pressure at or near the temperature at which the absorption is effected. For example, with benzol of a given partial tension, ordinary wood charcoal will absorb only from 5 to 6% by weight of the benzol, while properly activated carbon will absorb 40% or more. This is true even where the two classes of carbon have about the same apparent density; their active surfaces, as reflected in the absorption of $SO_2$, are on the same order of magnitude, and from this it can properly be supposed that they have about the same compactness. Accordingly it is apparent that chemical differences in the two classes of carbon are more important than their physical differences.

If one analyzes the two classes of carbon, it will be found that the differences in the ash are negligible, but on the other hand, it will be found that the two classes have a very different hydrogen content. The wood charcoal may contain as much as 2% or more of hydrogen, while carbon activated will contain only .5% of hydrogen, or less.

This hydrogen undoubtedly forms part of organic combinations which are distributed throughout the mass, since the activated carbon cannot be made to retain any such proportion of hydrogen, even after it has been saturated with hydrogen at high pressure. Even if this is done repeatedly, it will be found that the active carbon will retain much less hydrogen than the ordinary charcoal. In the same way if the carbon is saturated with hydrocarbons, the latter can, quite readily, be removed by relatively low temperature steaming, without material loss in activity.

From the foregoing considerations, I have concluded that the absorption of gases by charcoal (including active carbon) is originally an adsorption, that is to say, an action taking place between heterogeneous surfaces represented by carbon and gas, but that this is followed by a phenomenon of a capillary nature which depends solely upon the action of the gas molecules held by adsorption on the carbon surfaces upon other gas molecules of the same kind. This theory fully explains why a different effect is attained when working with a gas under conditions far removed from the liquid or solid phase of the gas as compared with those obtained when working with a vapor which under the conditions of temperature and pressure used is readily adapted to go into the liquid or solvent state. Apparently the presence of hydrogen in the carbon is of primary importance as influencing this second capillary absorption, for, as we have seen, when working with a gas such as $SO_2$ in low concentrations, where the capillary effect is negligible, then the adsorption powers of the two classes of carbons discussed are substantially identical. From this it follows that the activity of an amorphous carbon of a given density and capacity depends solely upon its purity as regards hydrogen, and that there is no such form as amorphous inactive carbon. This phenomenon may perhaps have led earlier investigators, who were working empirically, to believe that an inactive form of amorphous carbon existed. An examination of the X-ray spectra fails to indicate two different forms of amorphous carbon.

In any event, an erroneous opinion has existed which has assumed considerable importance, especially during the last twenty years, that high temperatures must not be used during the activation.

My present invention is based specifically upon the use of high temperature calcination under conditions which will cause the hydrogen of the carbon masses to be substantially eliminated. I accomplish this by permeating the raw material with a substance preferably in the liquid phase, or in solution, which will at high temperatures act rapidly to remove the hydrogen but which will have relatively little effect on the carbon masses. For this purpose I may, for example, use the identical substances which heretofore have been used at relatively low temperatures, such as zinc chloride, or phosphoric acid. In general, I have found that many oxides either introduced as such, or formed during the calcination of the substance (such as zinc oxide produced by the decomposition of zinc chloride), will destroy the organic combinations and remove the hydrogen before acting upon the amorphous carbon.

The only condition required is that the proper temperature shall be attained in order that the oxide shall act in an effective manner, and it is this necessity that differentiates my said process from all the known processes wherein the same substances which afford dehydrogenizing oxides are indeed employed, but in which the dehydrogenizing action is not given its full advantage.

According to my process, an oxide should be selected which will not be reduced by the solid portions of the charcoal at the temperature used, but which will be reduced quite easily by the carbon or hydrogen set free by the disassociation of hydrocarbons. This means that one should not use an oxide which is too easily reduced such as is the case with lead oxide, nor should one use an oxide which is too difficult to reduce, as for example, aluminum oxide.

If a suitable oxide is used, the temperature should be high enough to cause a slow breaking down of the hydrocarbons to take place. From this it follows that for all oxides suitable, a favorable temperature is in the neighborhood of 1000° C.

For instance, should I employ zinc chloride, I do not limit the effect to the dehydrating and carbonizing action of this body, which takes place below 700° C. If the action is stopped at this temperature, one may by washing with dilute hydrochloric acid recover a good proportion of the zinc chloride employed, and obtain a carbon which is sufficiently active for a certain number of uses. But, in such methods, I seek to obtain a carbon having a great activity, and for this purpose I raise the temperature to 800° or 1000° C., or even more, the temperature being chiefly limited by the necessity of using retort furnaces whereby the product will be protected from oxidation by air or fumes.

The dehydrating action of the zinc chloride, which takes place at relatively low temperature, is accompanied by a marked hydrolysis, and hydrochloric acid is disengaged in abundance, whilst the major part of the zinc remains in the carbon in the state of oxide. As I above remarked, when this action is completed, i. e., near 700° C., the result is a carbon which will, even at this point, possess a marked activity when it is freed from the zinc oxide by washing with dilute hydrochloric acid. But I do not stop the operation at this stage, and I raise the temperature until the zinc oxide is reduced by the hydrogenized bodies thereby effecting a removal of hydrogen from the carbon. Vapors of zinc and zinc oxide will be disengaged, corresponding to the decomposition of the last remaining hydrogenized compounds.

When the action is completed, at the end of a time which depends upon the temperature attained, the carbon is cooled out of contact with air, and is freed from the zinc oxide and metallic zinc retained therein, by washing with dilute hydrochloric acid.

Contrary to the prevailing opinion as to the unfavorable action of high temperatures such as I employ, the resulting carbon is extremely active.

My said process is of an absolutely general nature. By way of example, I have found that an excellent carbon can be obtained by adding oxychloride of arsenic to any suitable vegetable substance, and from a certain temperature onward, this will leave in the carbon a residue of arsenious acid; the temperature is raised until the arsenic reduced by the hydrocarbons is distilled off.

Obviously, considerations of expediency and hygiene may forbid the use of this substance in manufacture, but this experiment clearly shows that the decomposition of the hydrogenized substances which will withstand calcination can be readily effected with all oxides whether of a metal or metalloid, basic or the anhydride of an acid. What is of essential importance is not that the compound shall finally become an oxygenated binary compound, but that its decomposition at a sufficient temperature, shall be accompanied by the oxidation of the hydrogen in combination in the hydrogenized substances which withstand the calcination. Phosphoric acid may be given as an example of ternary compounds, and I may even employ more complex bodies such as the monocalcic or bicalcic phosphates.

In view of the preceding, I need not lay stress upon the fact that the useful effect does not consist in the dehydrating or carbonizing action of such bodies at low temperatures.

Sulphuric acid and ferric chloride are powerful dehydrating agents, but the carbons obtained by the use of these agents still contain a considerable amount of combined hydrogen, and have but a moderate absorbing power, being inferior to the carbons obtained by oxidation in superheated steam, which latter is however neither of a dehydrating nor a carbonizing nature, or is only so by reason of its high temperature.

But the complete dehydrogenation can not be had by means of steam, since after a certain temperature, which must however be exceeded to obtain the complete dehydrogenation,—the steam will act with like facility upon amorphous carbon which is thus destroyed in the same proportions as the hydrogenated bodies.

As stated above, I set aside the oxidizing substances, which could only be utilized in the form of vapors which are supplied during the calcination; such substances act chiefly on the outer parts of the carbonized masses, and in these parts they oxidize the amorphous carbon, whilst they have but little action on the hydrogenized substances contained in the better protected parts of the carbon. Moreover, I prefer not to use the substances which can be mixed with the carbonizable material only as solids, as they will not permeate and give the results that can be obtained by the use of liquids or solutions.

Should it be found that with oxidizing agents, whose volatility is not absolutely negligible at the high temperatures attained, this volatility prevents the continuation of the chemical action for a sufficient length of time to obtain a very active carbon, it will be necessary to stop the calcination of this carbon, and to again impregnate it with the oxidizing agent, and to effect a new calcination, and this operation may be repeated as often as required.

In like manner, I may effect successive calcinations wherein various oxidizing agents are employed in succession, and this may be carried out for different reasons, for example to afford the solubility of the inorganic matter contained in the carbon, or on the contrary to render this matter quite insoluble.

In some circumstances, particularly where the oxidizing agent likewise has a dehydrating action at lower temperatures, it may be advantageous to use a relatively large amount of such agent to attain the maximum dehydrating action, but it may be disadvantageous or undesirable to allow the full amount of such material to remain in the carbon during the final calcination. When such a circumstance arises, I use the amount of material desired to obtain the carbonizing or dehydrating effect, and heat the mass until it has become carbonized and sufficiently strong to withstand washing, but not up to the temperature where such material decomposes and starts to remove hydrogen. The excess of the oxidizing agent can then be washed out, care being taken to leave enough of this agent in the material to give the desired dehydrogenating action. The washing can of course be carried out by any necessary solvent which will not have an injurious effect on the carbon, and may be repeated several times so as to obtain solutions which are as rich as possible; for example, one may first wash the material with a solution obtained from the second washing of a prior operation, and then give the material a second washing with the solution used for the third washing from a prior operation, etc. and finally one can wash the material with the solvent alone. The solution which has been used three times can be re-concentrated or can be enriched by added quantities of the reagent and then re-used. In some instances where the reagent is of no particular value, it may still be desirable to wash out the excess, so as to eliminate, as far as possible, the oxidation of the carbon itself by such oxidizing agent.

If the oxidizing agent is valuable, care should be taken to recover as much as possible either by a preliminary washing such as has been referred to, or by the method in which the final calcination is carried on. For example, if zinc chloride is used, which later is converted into zinc oxide, there will be evolved during the final calcination, fumes of zinc oxide and metallic zinc which can be collected and recovered. The carbon obtained can be washed with dilute hydrochloric acid to remove and recover any zinc oxide or metallic zinc that may remain in the mass.

If phosphoric acid or monocalcium phosphate is the oxidizing agent selected, it will be found that fumes of $PH_3$ will be evolved as the temperature approaches 800° C. The temperature should be raised above this point, and as it goes up, there will be chiefly an evolution of $P_2H_4$, and finally of phosphorus. The maximum benefit is attained by raising the temperature to the point where phosphorus is largely evolved, and in this case, particularly if the phosphate was used as the oxidizing agent, one obtains not only the valuable active carbon, but also the phosphorus as a by-product. Activation is practically completed when the evolution of phosphides ceases, but for some purposes the carbon should be free of phosphorus and the method of distilling off the phosphorus is an economical method of removing it. The phosphorus may be separated from the other fumes in any desired way, and a very advantageous manner is to let the gases pass over active carbon which will retain the phosphorated hydrogen and phosphoric vapors which have escaped condensation. The residual gases will be found to be combustible and may be burned for any desired purpose. The phosphorus can, if desired, be burned with the minimum amount of air necessary to obtain phosphoric anhydride. It is advantageous to separate the phosphorus from the other gases, as otherwise a larger amount of air will be necessary to carry on the combustion, and there will be difficulty in separating the finely divided phosphoric anhydride, which is always contaminated with phosphorus anhydride, from the gases that will remain. However, if desired, the evolved gases may be burned immediately and the phosphoric anhydride ($P_2O_5$) formed may be collected in a suitable condensation and hydration apparatus.

It is even possible to control the operation so that a large amount of phosphorus can be obtained; for example, one may use as much as four parts of monocalcium phosphate to one part of carbonizable material such, for example, as peat or animal matter. Carbon made by other processes may be activated to a certain extent in this way, but in such case, the suggested proportion is to use two parts of monocalcium phosphate to one part of charcoal. Under these conditions calcination and conversion will be complete in from eight to twelve hours.

The proportions which are given above are only intended as indications. It may be said generally that in order to obtain very active carbons, a smaller quantity of reducing agent should be used, and in any event, there should be a large excess of carbon which will not be oxidized by the reduction of the acid constituents of the monocalcium phosphate.

In carrying out my invention, I prefer to use a vegetable material such as peat which is finely ground and mixed with the oxidizing material and sufficient liquid to give the finished product the desired capacity, as is explained in my co-pending application, Ser. No. 25,707, filed April 24, 1925. The mixture is then molded as explained in that application, dried, and calcined at the temperature necessary for producing the dehydrogenizing effect which has been referred to. The resulting carbon may then be washed, as has already been explained, and if necessary may be once more calcined. Of course other forms of vegetable material may be used and therefore in the claims I use the term "cellulosic material" as defining the type of material of vegetable origin available in my process.

By carrying out the process of manufacturing active carbon as outlined in this application, one can readily obtain carbons of an operable density (for example, having a compactness between .7 and .15) which will have a hydrogen content substantially below .5%. By the selection of favorable materials and oxidizing agent, it is possible to reduce the hydrogen content below .3%, and in some instances where particular care is taken in conducting the operations, it can be so completely removed that, for practical purposes, it may be said that substantially all of the hydrogen is eliminated.

In order better to understand my invention, one example is given:

Finely ground peat moss was mixed with a solution of monocalcium phosphate to form a stiff paste. This was extruded, granulated and dried for one hour at a temperature sufficiently high to cause some carbonization of the peat to take place. The mass was then put in a closed retort and the temperature raised. As the temperature passed beyond 700° C. and approached 800° C., there was an evolution of $PH_3$. As the temperature was kept rising, $P_2H_4$ was evolved, and finally there was an evolution of phosphorus. The temperature was maintained at approximately 1000° C. until no more phosphorus was evolved. The phosphorus fumes were absorbed in previously activated carbon and later converted into phosphoric anhydride by burning with a minimum quantity of air. The carbon was allowed to cool slowly, washed with dilute hydrochloric acid, dried, and again calcined for about three hours at a temperature of about 800° C. The resulting product was found to have a density of about 0.3, and on analysis was found to have a hydrogen content of only .1%. It showed very high activity for the absorption of various vapors, for example, it absorbed 65% by weight of benzol.

Certain phases of my invention which formerly were disclosed in application, Ser. No. 25,707, filed April 24, 1925, are now claimed in this application.

What I claim is:

1. The process of manufacturing active carbon which comprises the steps of impregnating cellulosic material with a substance of acid reaction comprising oxygen and phosphorus in chemical combination, and thereafter heating the material above 700° C. and until there is a substantial evolution of phosphides.

2. A process as defined in claim 1, in which the material is heated during calcination until there is an evolution of phosphorus vapor.

3. A process of manufacturing active carbon and recovering a reagent in a form adapted for use in manufacturing additional quantities of active carbon which comprises the steps of subjecting cellulosic material to the action of a substance of acid reaction comprising oxygen and phosphorus in chemical combination at a temperature sufficiently high to cause an evolution of phosphorus and continuing such heating until the evolution of phosphorus substantially ceases.

4. The process of producing active carbon and phosphorus which comprises the steps of treating monocalcium phosphate and a substantial excess of cellulosic material in a retort at a temperature high enough to cause phosphorus to be largely evolved.

5. The process of producing active carbon which comprises the steps of permeating cellulosic material with a liquid comprising a material adapted to act at a temperature below 700° C. as a dehydrating agent and at higher temperatures to effect the removal of hydrogen by chemical reaction, and calcining such material in a substantially closed retort permitting the escape of gases, at a temperature substantially above 700° C. and sufficiently high to cause said latter reaction to take place.

6. A process as defined in claim 5, in which a part of the reaction products of said dehydrating material is washed out after carbonization has taken place and before the final calcining temperature is reached.

7. The process of producing active carbon which comprises the steps of mixing together cellulosic material and a dehydrating and oxidizing agent which can be heated in the presence of such cellulosic material to 700° C. without being fully volatilized, and heating such mixture to a temperature above 800° C.

8. A process as defined in claim 7, in which the mixture is heated to a temperature of approximately 1000° C.

9. In the process of producing active carbon, the step of permeating cellulosic material or the like with a solution of a substance adapted to be brought in the presence of such cellulosic material to relatively high temperatures at which that substance is adapted, in the presence of the cellulosic material to decompose and generate products adapted to combine with hydrogen; and thereafter heating to the temperature at which such substance will decompose, to remove the hydrogen.

10. In the process of producing active carbon, the steps of permeating cellulosic material or the like with phosphoric acid and then heating the material to the point where the phosphoric acid is decomposed with the formation of phosphides and hydrogen is largely removed.

11. The process of producing active carbon, which comprises the steps of mixing together cellulosic material and a substance comprising the $PO_4$ radical in acid combination in excess of bases present, and heating such mixture until elemental phosphorus is evolved.

EDOUARD URBAIN. [L. S.]